US008457496B2

(12) United States Patent
Zami et al.

(10) Patent No.: US 8,457,496 B2
(45) Date of Patent: Jun. 4, 2013

(54) OPTICAL SIGNAL SWITCHING DEVICE (75) Inventors: Thierry Zami, Nozay (FR); Nicolas Brogard, Montrouge (FR)

(73) Assignee: Alcatel Lucent, Paris (FR)

( * ) Notice: Subject to any disclaimer, the term of this patent is extended or adjusted under 35 U.S.C. 154(b) by 545 days.

(21) Appl. No.: 12/459,300

(22) Filed: Jun. 30, 2009

(65) Prior Publication Data
US 2010/0014863 A1    Jan. 21, 2010

(30) Foreign Application Priority Data

Jun. 30, 2008  (FR) ...................................... 08 54418
Oct. 29, 2008  (FR) ...................................... 08 57360

(51) Int. Cl.
*H04J 14/00* (2006.01)
*H04J 14/02* (2006.01)
(52) U.S. Cl.
CPC ...................................... *H04J 14/02* (2013.01)
USPC ..................... 398/82; 398/48; 398/49; 398/50
(58) Field of Classification Search
USPC ................................................ 398/48, 49, 50
See application file for complete search history.

(56) References Cited

U.S. PATENT DOCUMENTS

| | | | | | |
|---|---|---|---|---|---|
| 5,636,210 | A | * | 6/1997 | Agrawal | 370/390 |
| 5,889,600 | A | * | 3/1999 | McGuire | 398/50 |
| 6,449,073 | B1 | * | 9/2002 | Huber | 398/82 |
| 6,658,175 | B2 | * | 12/2003 | Zami et al. | 385/16 |
| 6,771,905 | B1 | * | 8/2004 | Bortz | 398/45 |
| 6,888,664 | B2 | * | 5/2005 | Lee et al. | 359/326 |
| 7,010,225 | B1 | * | 3/2006 | Dasylva et al. | 398/45 |
| 7,177,542 | B2 | * | 2/2007 | Zami | 398/45 |
| 7,274,873 | B2 | * | 9/2007 | Bortz | 398/45 |
| 7,366,370 | B2 | * | 4/2008 | Goodwill et al. | 385/24 |
| 7,499,650 | B2 | * | 3/2009 | Wang et al. | 398/53 |
| 7,536,103 | B2 | * | 5/2009 | Zami et al. | 398/49 |
| 7,653,307 | B2 | * | 1/2010 | Peloso et al. | 398/50 |

(Continued)

FOREIGN PATENT DOCUMENTS

EP  1 349 417 A  10/2003
EP  1 879 308 A   1/2008

OTHER PUBLICATIONS

Wei S Hu et al; Multicasting Optical Cross Connects Employing Splitter-and-Delivery Switch; IEEE Photonics Technology Letters; Jan. 1, 1998; pp. 970-972, vol. 10, No. 7; IEEE Service Center; Piscataway, NJ, US.

(Continued)

*Primary Examiner* — Kenneth N Vanderpuye
*Assistant Examiner* — Amritbir Sandhu
(74) *Attorney, Agent, or Firm* — Carmen Patti Law Group, LLC (57) ABSTRACT An optical signal switching device comprises a plurality of broadcast couplers (125), a plurality of wavelength selective modules (126), and optical connection means linking outputs of broadcast couplers to inputs of wavelength selective modules in order to route incoming optical signals received by said broadcast couplers to said wavelength selective modules. The wavelength selective modules are arranged in a plurality of groups (117, 118, 119), the wavelength selective modules of one group being connected at the output to a common neighboring node. The optical connection means (127, 41, 40, 42) are configured in such a way as to enable, for each of said broadcast couplers, the broadcasting of the incoming optical signal received by said coupler to at least one wavelength selective module of each group simultaneously.

19 Claims, 6 Drawing Sheets

U.S. PATENT DOCUMENTS

| | | | |
|---|---|---|---|
| 7,672,587 B2* | 3/2010 | Zami et al. | 398/50 |
| 7,689,121 B2* | 3/2010 | Peloso et al. | 398/58 |
| 7,983,560 B2* | 7/2011 | Maki et al. | 398/50 |
| 8,150,264 B2* | 4/2012 | Tang et al. | 398/82 |
| 2001/0010586 A1* | 8/2001 | Furusawa et al. | 359/133 |
| 2001/0019653 A1* | 9/2001 | Kato et al. | 385/127 |
| 2002/0044315 A1* | 4/2002 | Sugawara et al. | 359/110 |
| 2002/0048066 A1* | 4/2002 | Antoniades et al. | 359/128 |
| 2002/0063926 A1* | 5/2002 | Nishi et al. | 359/128 |
| 2002/0071157 A1* | 6/2002 | Sauze et al. | 359/128 |
| 2002/0145784 A1* | 10/2002 | Zhang et al. | 359/128 |
| 2002/0186725 A1* | 12/2002 | Araki | 370/539 |
| 2003/0030887 A1* | 2/2003 | Lee et al. | 359/326 |
| 2003/0180045 A1* | 9/2003 | Tajima | 398/42 |
| 2004/0057661 A1* | 3/2004 | Okuno | 385/24 |
| 2004/0151173 A1* | 8/2004 | Preisach | 370/386 |
| 2004/0208551 A1* | 10/2004 | Weverka | 398/50 |
| 2005/0163430 A1* | 7/2005 | Noirie et al. | 385/56 |
| 2006/0045532 A1* | 3/2006 | Yano | 398/147 |
| 2006/0132174 A1* | 6/2006 | Zami et al. | 326/41 |
| 2006/0251418 A1* | 11/2006 | Schafer et al. | 398/45 |
| 2008/0260383 A1* | 10/2008 | Zhong et al. | 398/50 |
| 2009/0226168 A1* | 9/2009 | Boduch | 398/48 |
| 2009/0232492 A1* | 9/2009 | Blair et al. | 398/5 |
| 2009/0232497 A1* | 9/2009 | Archambault et al. | 398/50 |
| 2010/0034532 A1* | 2/2010 | Ghelfi et al. | 398/2 |
| 2010/0215366 A1* | 8/2010 | Sato et al. | 398/49 |
| 2010/0260500 A1* | 10/2010 | Ji et al. | 398/50 |

OTHER PUBLICATIONS

Zami T et al; Driving Technologies Addressing the Future Dynamic Transparent Core Networks; Transparent Optical Networks, 2008; Jun. 22, 2008; pp. 194-197; ICTON 2008; 10th Anniversary Int'l Conf. ON; IEEE, Piscataway, NJ, USA.

Paolo Ghelfi et al; Optical Cross Connects Architecture with per-Node Add&Drop Functionality; Optical Fiber Communcation Conference and Exposition National Fiber Optic Engineers Conf.; Mar. 25-29, 2007; pp. 1-6; Anaheim, CA, USA, IEEE-Piscataway, NJ, USA.

Keyworth B P; ROADM Subsystems & Technologies; Optical Fiber Communcation Conference, 2005; Technical Digest, Mar. 2005; pp. 35-38; vol. 3, 6; OFC/NF OEC Anaheim, CA, USA; Piscataway, NJ, USA, IEEE.

Mechels S et al; 1D MEMS-Based Wavelength Switching Subsystem; IEEE Communications Magazine; Mar. 1, 2003; pp. 88-94; vol. 41, No. 3; IEEE Service Center, Piscataway, US.

* cited by examiner

FIG_1

FIG_2

FIG_6

FIG_7

FIG_9

OPTICAL SIGNAL SWITCHING DEVICE

The invention pertains to the field of transparent WDM optical networks, particularly to switching devices for a transparent optical network which are capable of switching wavelength channels without converting them into electronic signals.

Mastery of optical fiber wavelength division multiplexing (or WDM) optical transmission technology is a major factor in meeting the increasing needs of data transfer rates in the transmission of information. The term "transparent" is applied to a transmission system in which the signal remains optical without being converted into an electronic signal. Transparency in optical communication networks is a characteristic that makes it possible to reduce the cost of network equipment by eliminating optical-electrical-optical conversions, and therefore the corresponding transducers. Subsystems used in transparent WDM networks particularly include reconfigurable optical add-drop multiplexers, or ROADMs, and optical crossconnects, or OXCs. In order to construct such subsystems, equipment known as Wavelength Selective Switches, or WSSs, are particularly attractive. This is because this equipment makes it possible to create switching nodes with any degree whatsoever having a very flexible configuration with a much simpler structure than when using discrete components, as well as a reduced size and high reliability. Wavelength Selective Switches and their applications are described, among other places, in S. Mechels et al., IEEE Communication Magazine, March 2003, pp 88-94.

In one embodiment, the invention discloses an optical signal switching device comprising:
a plurality of broadcast couplers, each one comprising an input capable of receiving an incoming wavelength division multiplexed optical signal and a first plurality of outputs in order to broadcast said incoming optical signal,
a plurality of wavelength selective modules, each one comprising a first plurality of inputs for receiving wavelength channels and an output for transmitting an outgoing wavelength division multiplexed optical signal selectively obtained from the wavelength channels received at said first plurality of inputs,
optical connection means linking a second plurality of said outputs of broadcast couplers to a second plurality of said inputs of wavelength selective modules in order to route the incoming optical signals received by said broadcast couplers to said wavelength selective modules,
said wavelength selective modules being arranged into a plurality of groups, at least one of said groups comprising multiple said wavelength selective modules, the wavelength selective modules of one group each being intended to be connected at their output to a common neighboring node, such as via the same optical cable, said optical connection means being configured in such a way as to enable, for each of said broadcast couplers, the broadcasting of the incoming optical signal received by said coupler to at least one wavelength selective module of each group simultaneously.

In other advantageous embodiments, the method may exhibit one or more of the following characteristics:
the broadcast couplers are configured into a plurality of groups, at least one of said groups comprising multiple said broadcast couplers, the broadcast couplers of one group each being intended to be connected to a common neighboring node, such as via the same optical cable.
at least one or each of the wavelength selective modules comprises about as many of said inputs as the number of groups of broadcast couplers. Such a configuration makes it possible to use wavelength selective modules whose number of ports is relatively low compared with the number of optical fibers connected to the device.
said groups of broadcast couplers and said groups of wavelength selective modules are equal in number. In one variant, the device may be asymmetrical in this respect.
the optical connection means are configured so as to enable, for each of said wavelength selective modules, the simultaneous routing of optical signals coming from at least one broadcast coupler in each group of couplers to said wavelength selective module.
at least one or each of said broadcast couplers comprises about as many of said outputs as the number of groups of wavelength selective modules. Such a configuration makes it possible to use broadcast couplers whose number of ports is relatively low compared with the number of optical fibers connected to the device, and therefore to limit add losses.
said optical connection means comprise waveguides each connecting an output of said second plurality of outputs to an input of said second plurality of inputs.
the waveguides connect each broadcast coupler to at least one wavelength selective module in each group.
a broadcast coupler receiving said incoming optical signal from a neighboring node has no direct optical connection with a group of wavelength selective modules connected to said neighboring node. Such a configuration makes it possible to reduce the number of ports used in the wavelength selective modules.
said optical connection means comprise at least one optical spatial switching matrix comprising inputs connected to outputs of said second plurality of outputs and outputs connected to inputs of said second plurality of inputs.
the outputs of the optical spatial switching matrix are connected to at least one wavelength selective module from each group, or to each of the wavelength selective modules.
the inputs of the optical spatial switching matrix are connected to at least one broadcast coupler from each group, or to each of the broadcast couplers.
said optical connection means comprise a plurality of optical spatial switching matrices comprising inputs connected to outputs of said second plurality of outputs and outputs connected to inputs of said second plurality of inputs.
the number of said optical spatial switching matrices is less than or equal to the number of said inputs of a wavelength selective module, each of said wavelength selective modules having inputs connected to all of said optical spatial switching matrices, each of said broadcast couplers having outputs connected to all of said optical spatial switching matrices.
at least one or all of said broadcast couplers comprises an output connected to a drop module in order to demodulate the digital data carried by at least one wavelength channel of the incoming optical signal received by said broadcast coupler. In one variant, a drop module may be connected to other points of the device.
at least one or all of said wavelength selective modules comprises an input connected to an add module in order to insert at least one wavelength channel into the outgoing optical signal emanating from said wavelength selective module. In one variant, an add module may be connected to other points of the device.
the broadcast couplers and the wavelength selective modules are equal in number. In one variant, the device may be asymmetrical in this respect. In one particular embodiment, said switching device further comprises:

at least one recirculation assembly, said or each recirculation assembly comprising a wavelength recirculation module comprising a plurality of inputs for receiving wavelength channels and an output for transmitting a wavelength division multiplexed recirculated optical signal selectively obtained from wavelength channels received at said plurality of inputs, a recirculation coupler comprising an input connected to the output of said wavelength recirculation module in order to receive said recirculated optical signal, and a plurality of outputs for broadcasting said recirculated optical signals, second optical connection means linking a third plurality of said outputs from broadcast couplers to a third plurality of inputs of the wavelength recirculation module(s) in order to route incoming optical signals received by said broadcast couplers to the wavelength recirculation module(s), third optical connection means linking a fourth plurality of outputs from the recirculation coupler(s) to a fourth plurality of said inputs of wavelength selective modules in order to route the recirculated optical signals received by the recirculation coupler(s) to said wavelength selective modules.

The switching device according to this particular embodiment may also exhibit one or more of the following characteristics:

the second optical connection means are configured in such a way as to simultaneously route incoming optical signals received by at least one broadcast coupler in each group to said or each wavelength recirculation module.

the third optical connection means are configured in such a way as to enable the broadcasting of said or each recirculated optical signal to at least one wavelength selective module in each group simultaneously.

the number of inputs in the third plurality is greater than or equal to the number of broadcast couplers. In other words, the number of recirculation assemblies and the number of inputs in every recirculation module are such that each broadcast coupler is connected to at least one recirculation assembly.

the number of outputs in the fourth plurality is greater than or equal to the number of wavelength selective modules. In other words, the number of recirculation assemblies and the number of outputs in every recirculation coupler are such that each wavelength selective module is connected to at least one recirculation assembly.

the second and third optical connection means comprise waveguides each connecting an output of said third, or respectively fourth, plurality of outputs to an input of said third, or respectively forth, plurality of inputs.

no direct optical connection links a recirculation coupler's output to a wavelength recirculation module's input.

One idea at the basis of the invention is to design broadcast-and-select optical architectures for nodes with a high number of incoming and outgoing fibers, while limiting the number of ports needed at the wavelength selective modules.

Another idea at the basis of the invention is to take into account the connectivity of nodes in terms of connection directions, meaning in terms of neighboring nodes with which traffic is exchanged. A connection direction may comprise a plurality of optical fibers connected to the same neighboring node, which may therefore be used in an equivalent manner in order to transfer an optical signal to said neighboring node. The optical fibers of the connection direction may potentially be arranged in the form of a cable.

The invention will be better understood, and other purposes, details, characteristics, and advantages thereof will become more clearly apparent upon examining the following description of multiple particular embodiments of the invention, which are given only by way of illustrative and non-limiting examples, with reference to the attached drawings.

Figure 7:
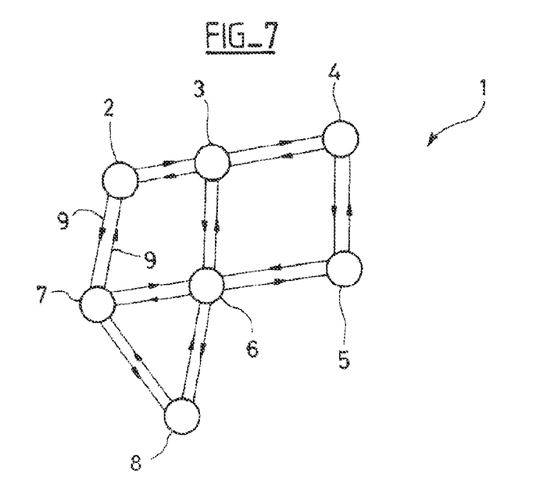
FIG. 7 is a functional block diagram of an optical network in which the embodiments may be used.

With reference to FIG. 7, a WDM mesh network 1 comprises a plurality of optical nodes 2 to 8 connected by directional links represented by arrows 9. Each link may consist of one or more optical fibers. In particular, for a high-capacity network, for example a telecommunications provider's core network, a link must generally comprise multiple optical fibers. In order to facilitate their installation, these optical fibers may be combined in the form of a cable. In such a network, each of the nodes 2 to 8 must therefore be capable of switching optical signals between a large number of incoming and outgoing optical fibers, which each connect said node to a limited number of neighboring nodes. The number of neighboring nodes a node has is called its degree of connectivity. For example, in FIG. 7, the node 6 has a degree of connectivity equal to 4 and the node 3 a degree of connectivity equal to 3.

With reference to FIGS. 1 to 6, we will now describe multiple optical architectures which are suitable for constructing optical nodes of this sort. For simplicity's sake, only the optical portion of the switching node used to route optical signals between the node's inputs and outputs, and, if applicable, to locally add or drop optical signals, have been depicted. Many other components not depicted may be involved in the makeup of an optical note, particularly one or more command modules for controlling the switching, and, if applicable, for adding and dropping signals. In particular, this control must prevent collisions between wavelength channels.

Command modules may be constructed in various forms, in an individual or distributed manner, by means of hardware and/or software components. Hardware components that may be used are application-specific integrated circuits, field-programmable gate arrays, or microprocessors. Software components may be written in various programming languages, such as C, C++, Java, or VHDL. This list is not exhaustive.

Figure 1:
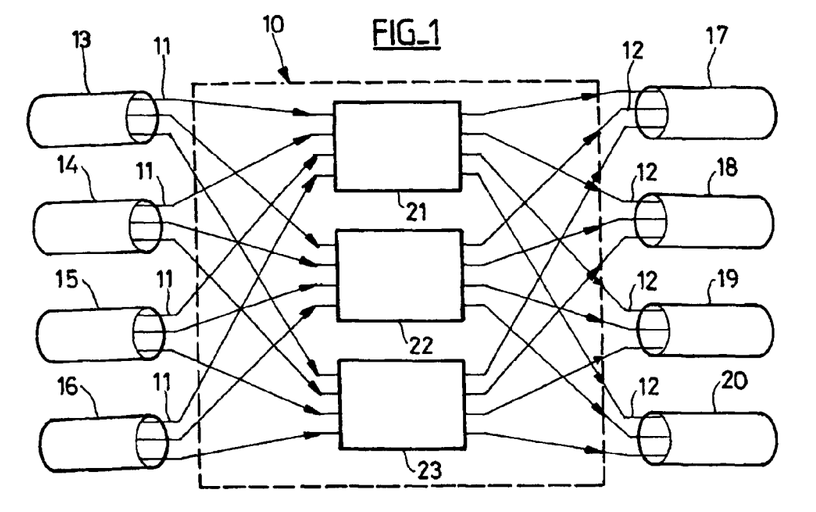
FIGS. 1 and 2 are a functional block diagram of an optical node according to a first embodiment.

With reference to FIG. 1, a switching device 10 suitable for constructing a degree-4 optical node has been depicted. Blocks 21, 22 and 23 refer to FIG. 2. The device 10 comprises inputs, here 12 in number, for connecting incoming optical fibers 11 carrying incoming wavelength division multiplexed channels, and outputs, here 12 in number, for connecting outgoing optical fibers 12 carrying outgoing wavelength division multiplexed channels. Numbers 13 to 16 designate four groups of incoming fibers 11, here with 3 fibers per group, which are each connected to the same neighboring node. Numbers 17 to 20 designate four groups of outgoing fibers 12, here with 3 fibers per group, which are each connected to the same neighboring node. A group's optical fibers may each be arranged in the form of one or multiple cables.

The architecture of FIG. 1 includes characteristics of broadcast and select architectures. Each input of the device 10 is connected to a broadcast coupler 25 that which receives the WDM signal and broadcasts it to multiple wavelength selective switches (WSS) 26. Each output of the device 10 is connected to a WSS 26 that receives WDM signals from multiple broadcast couplers 25. By extension, a group of broadcast couplers refers to all of the broadcast couplers 25 which are connected to a group of incoming fibers 13, 14, 15, or 16. Likewise, a WSS group refers to all of the WSSs 26 which are connected to a group of outgoing fibers 17, 18, 19, or 20.

A conventional broadcast-and-select architecture would consist of connecting each WSS 26 to each broadcasts coupler 25. For the node in FIG. 1, this traditional architecture would assume 12-input WSSs and 12-output couplers. Some drawbacks of such an approach are the high cost of WSSs with a high number of ports, and the add losses of the couplers, which increase with the number of outlets.

In contrast, in the embodiment in FIG. 1, each coupler is only connected to a single WSS 26 in every group, i.e. four WSSs. Additionally, each WSS 26 is connected to only four couplers 25. The optical connections 27 between the outputs of the couplers 25 and the inputs of the WSSs 26 may be optical fibers or other sorts of waveguides. Other components not shown may be installed on these connections, such as chromatic dispersion compensation modules or amplifiers, or other physical degradation compensation components.

Thus, if N is the node's degree of connectivity, the device 10 may be constructed with couplers having N output branches and WSSs having N input ports, and makes it possible to transparently route one or more channels from any incoming fiber 11 to the N neighboring nodes simultaneously.

As a reminder, a wavelength selective switch (WSS) is a piece of equipment comprising a plurality of selectable ports and at least one common port, which fulfill a programmable multiplexing function or a programmable de-multiplexing function. When it is acting as a multiplexer, the selectable ports serve as inputs, and a common port serves as a common output. The wavelength selective switch is capable of routing wavelength channels (i.e. optical signals carried by respective wavelengths) received at the inputs, selectively based on the wavelengths of the received channels and the respective inputs, and based on a command signal, to this equipment's common output. The channels routed to the common output must have different wavelengths. In this situation, the equipment carries out a programmable multiplexing function for providing a channel selected from among the received channels, or a multiplex of channels made up of a set of channels selected from among the received channels, at its output. At each input port, one channel, multiple channels, or no channel may be sent.

Figure 2:
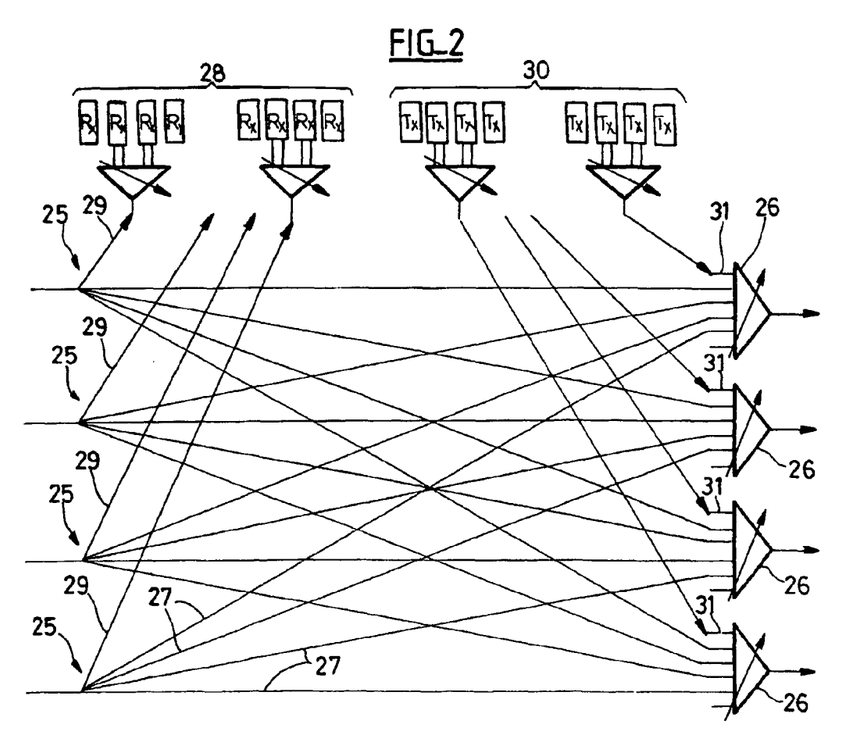

Optionally, as depicted in FIG. 2, the device 10 may comprise a drop module 28 connected to the couplers 25. In this situation, the couplers 25 comprise one or more additional outputs 29 to the drop module 28. The drop module 28 comprises one or more optical receivers for de-modulating the optical signal data to be dropped. It may also comprise miscellaneous optical components for selecting the channels to be dropped, such as demultiplexers, couplers, fixed or tunable filters, optical gates, WSSs, etc. In this situation, the number of outputs a coupler 25 has is greater than the node's degree of connectivity, for example equal to N+1.

Optionally, as depicted in FIG. 2, the device 10 may comprise an add module 30 connected to couplers the WSSs 25. In this situation, the WSSs 26 comprise one or more additional inputs 31 connected to the add module 30. The add module 30 comprises one or more optical transmitters, with fixed or tunable wavelengths, in order to generate the optical signals to be added. It may also comprise miscellaneous optical components for combining, routing, or conditioning the optical signals to be added, such as multiplexers, combiners, optical gates, amplifiers, WSSs, etc. In this situation, the number of outputs a WSS 26 has is greater than the node's degree of connectivity, for example equal to N+1.

In the embodiment in FIGS. 1 and 2, each WSS 26 comprises an input dedicated to a coupler 25 from each group, so as to be able to receive at least one WDM signal from each neighboring node. However, other arrangements are also possible with regard to the origin of the signals traveling through a single wavelength selective module. For example, another arrangement is depicted in FIG. 3, in which elements identical or analogous to those in FIG. 1 have the same reference number.

Figure 3:
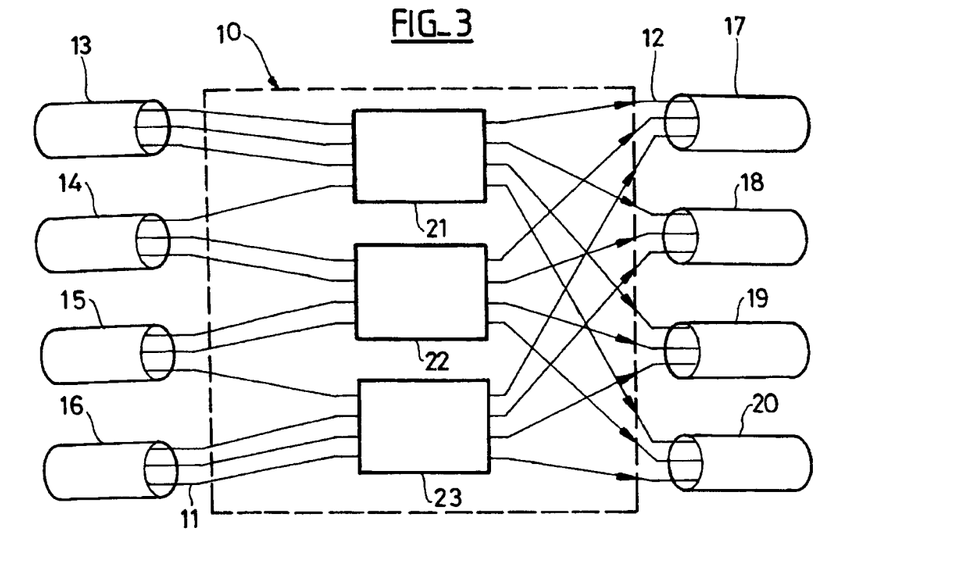
FIG. 3 is a functional block diagram of an optical node according to a second embodiment.
Figure 4:
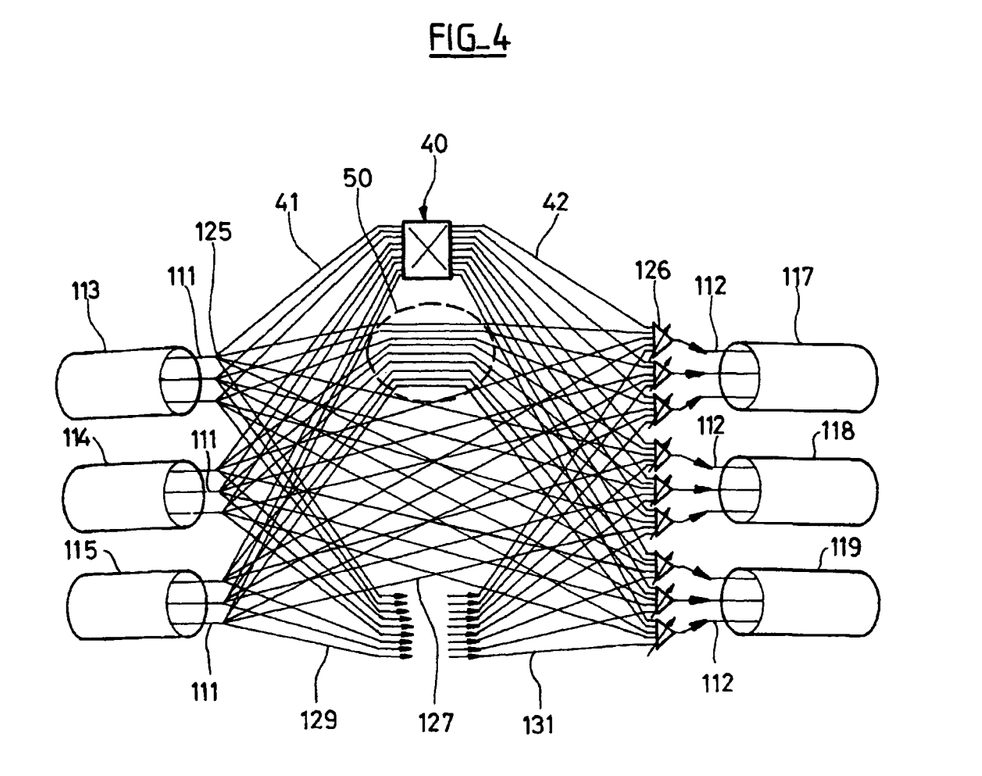
FIG. 4 is a functional block diagram of an optical node according to a third embodiment.

In FIGS. 1 and 3, blocks 21 to 23, which were depicted separately in order to keep the illustration clear, do not necessarily correspond to hardware structures of the node. With reference to FIG. 4, another embodiment will now be described, in which this block depiction was not used. Elements identical or analogous to the ones in FIGS. 1 and 2 have the same reference number, plus 100.

FIG. 4 schematically depicts a switching device 110 suitable for constructing a degree-3 optical node. The direct connections 127 between the broadcast couplers 125 and the WSSs 126 are configured in a manner similar to FIGS. 1 and 2, although the depiction is different. In other words, each WSS 126 comprises an input connected to a coupler 125 from each group 113, 114, and 115, and each coupler 125 comprises an output connected to a WSS 126 from each group 117, 118, and 119. The connections 129 represent an output branch from each coupler 125 devoted to dropping optical signals. The connections 131 represent an input branch from each WSS 126 devoted to adding optical signals.

The limited connectivity afforded by the direct connections 27/127 between the broadcast couplers 25/125 and the WSSs 26/126 may prove insufficient in certain situations. This is because, as the input signal received by a given coupler is only broadcast to a single WSS per group, it may only be transmitted over a single output fiber 12/112 per destination node. A competitive situation may occur for a wavelength channel over this outgoing fiber. Furthermore, if one of the WSSs 26/126 were to fail, the corresponding traffic cannot be protected by the switching device 10/110, because it cannot transfer this traffic to the same destination node via another WSS.

In order to increase the node's flexibility, particularly in the aforementioned situations, the switching device may comprise one or more optical spatial switching matrices arranged between the couplers 25/125 and the WSSs 26/126, either in addition to or replacing the direct connections 27/127.

In FIG. 4, a single optical spatial switching matrix 40 is provided, with one respective input connected to each of the couplers 125, via connections 41, and a respective output connected to each of the WSSs 126, via connections 42.

The number of input fibers 111 is called M, and here it is equal to the number of output fibers 112. The optical spatial switching matrix 40 is here a matrix with M inputs and M outputs. This is a component which carries out purely spatial routing that is strictly non-blocking. It is therefore capable of making a transparent connection from any input to any output. This connection is transparent to all spectral content found at the input in question, e.g. within a predetermined grid of wavelengths for which the matrix is designed. In other words, if it only enters one wavelength channel, this single channel is directed to the selected output. If it enters 100 channels, they're all directed to that matrix's output. Such a matrix is suitable for simultaneously and selectively routing M WDM signals, i.e. sets of spectral channels, respectively from the M inputs to the M outputs. Spatial switching matrices of this sort may be constructed using microreflectors controlled by microelectromechanical systems (MEMS). As they are particularly available from the companies Glimmer-Glass (Hayward, United States) and Polatis Inc. (Billerica, United States). The add losses may be relatively low, for example about 4 or 5 dB. The number of ports may be relatively high, for example 100 to 200.

In FIG. 4, using the matrix 40, one or more channels arriving at a given input fiber 111, and therefore at a coupler 125, may be routed to any WSS 126, and therefore to all the output fibers 112. This matrix may therefore be used to route these channels to their destination node via a different WSS from the WSS connected directly to that coupler, i.e. via another WSS from the group corresponding to that destination. In FIG. 4, the spatial switching matrix 40 is therefore arranged so as to complement the direct connections 127. One or more spatial switching matrices may be configured in this way, provided that a corresponding number of outputs are included at the couplers 125 and a corresponding number of inputs are included at the WSSs 126. Thus, in FIG. 4, the WSS have N+2 inputs.

Another possibility for improving the flexibility of the transparent signal switching is to include one or more spatial switching matrices arranged so as to replace certain direct connections 127. Corresponding embodiments will now be described with reference to FIGS. 5 and 6, in which elements identical or analogous to those in FIG. 4 have the same reference number.

Figure 5:
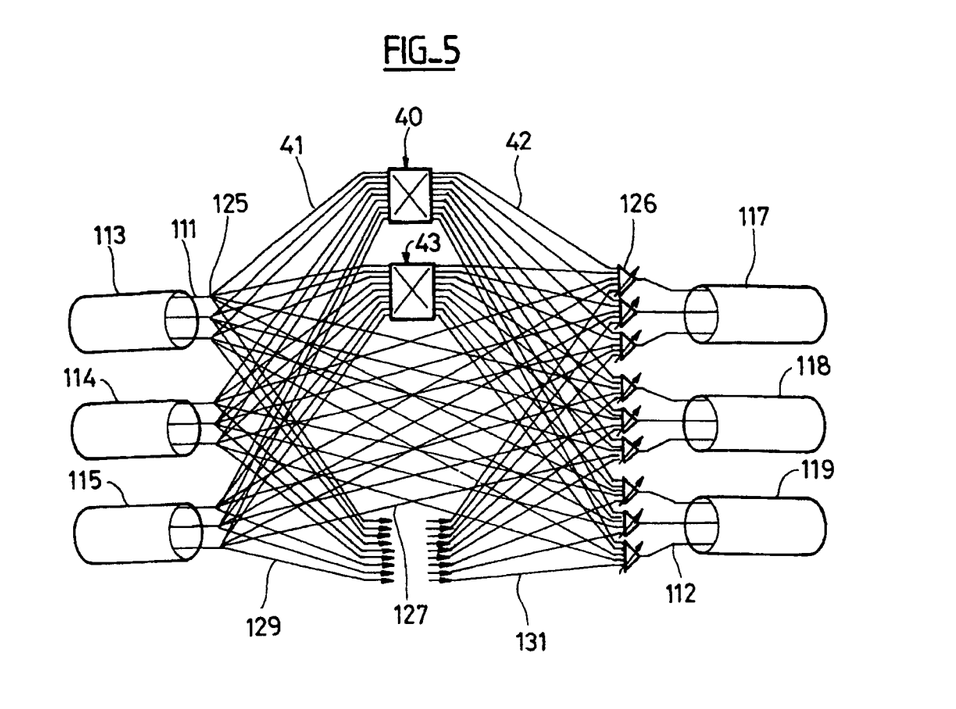
FIG. 5 is a functional block diagram of an optical node according to a fourth embodiment.

In one frequent usage, the traffic between the nodes of a transparent optical network is bidirectional, such that an optical node is connected to a neighboring node by both a group of incoming fibers and a group of outgoing fibers. For example, if the embodiment in FIG. 4 is used to construct node 3 in FIG. 7, the groups of fibers 113 and 117 are connected to the same neighboring node 2, the groups of fibers 114 and 118 are connected to the same neighboring node 4, and the groups of fibers 115 and 119 are connected to the same neighboring node 6. In this situation, the direct connections 127 which each connect a coupler 125 and a WSS 126 associated with the same neighboring node as the coupler, these connections being marked by the circle 50 in FIG. 4, are generally of limited or nonexistent usefulness for routing traffic. In FIG. 5, these direct connections are replaced by the spatial switching matrix 43, similar to the previously described matrix 40 and connected in the same way in parallel with it.

In FIG. 5, two matrices 40 and 43 are included, which makes it possible to increase the flexibility of signal routing, particularly to confront competitive and protection situations. In one variant of the embodiment in FIG. 5, such as to reduce the number of ports needed at the WSS 126, the matrix 40 with connections 41 and 42 may be eliminated.

Figure 6:
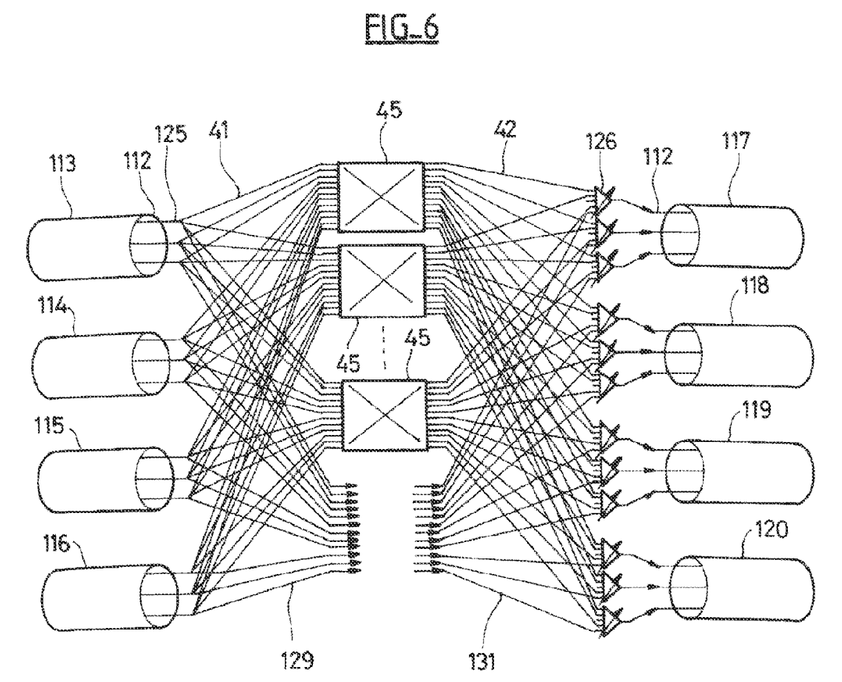
FIG. 6 is a functional block diagram of an optical node according to a fifth embodiment.

The flexibility of signal routing increases with the number of spatial switching matrices. FIG. 6 depicts an embodiment suitable for a degree-4 node, wherein there are no direct connections between the couplers 125 and the WSSs 126, only spatial switching matrices 45. Here, the number of these matrices is the same as the node's degree of connectivity, with one of them not being depicted. Each of the matrices 45 has a respective input connected to each of the couplers 125, via connections 41, and a respective output connected to each of the WSSs 126, via connections 42.

As may be seen in FIGS. 4 to 6, direct connections and spatial switching matrices may be combined in various proportions between the broadcast couplers 125 and the WSSs 126, depending on the desired routing flexibility. This flexibility may be measured by the number of distinct spatial pathways that the switching device can create between a given input fiber and a given destination node.

Despite the relatively low number of input ports that the WSSs 126 have (for example, this number may be equal to the number of incoming directions, e.g. four in FIG. 6, plus one for locally adding traffic if necessary), combining these WSSs with spatial switching matrices that have a large number of ports therefore makes it possible to create a node architecture with a satisfactory level of flexibility. In one variant, the number of spatial switching matrices may be greater than the node's degree of connectivity, being limited to the number of input ports that the WSSs 126 have.

Figure 8:
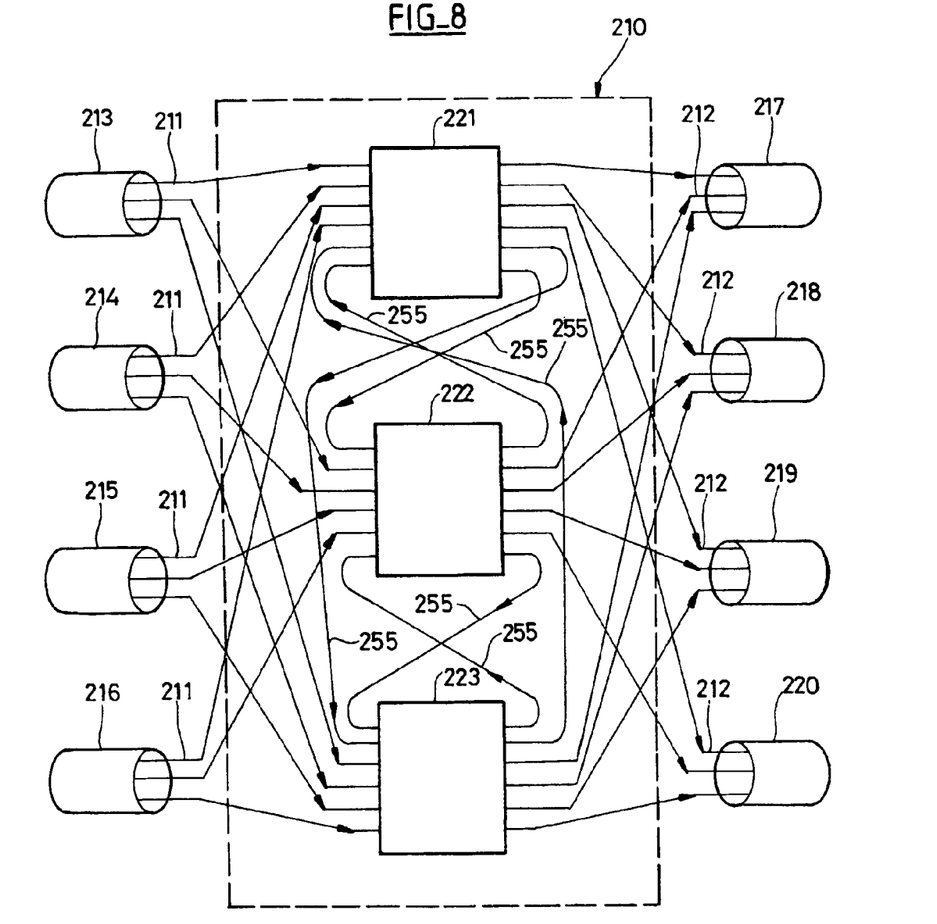
FIG. 8 is a functional block diagram of an optical node according to a sixth embodiment.
Figure 9:
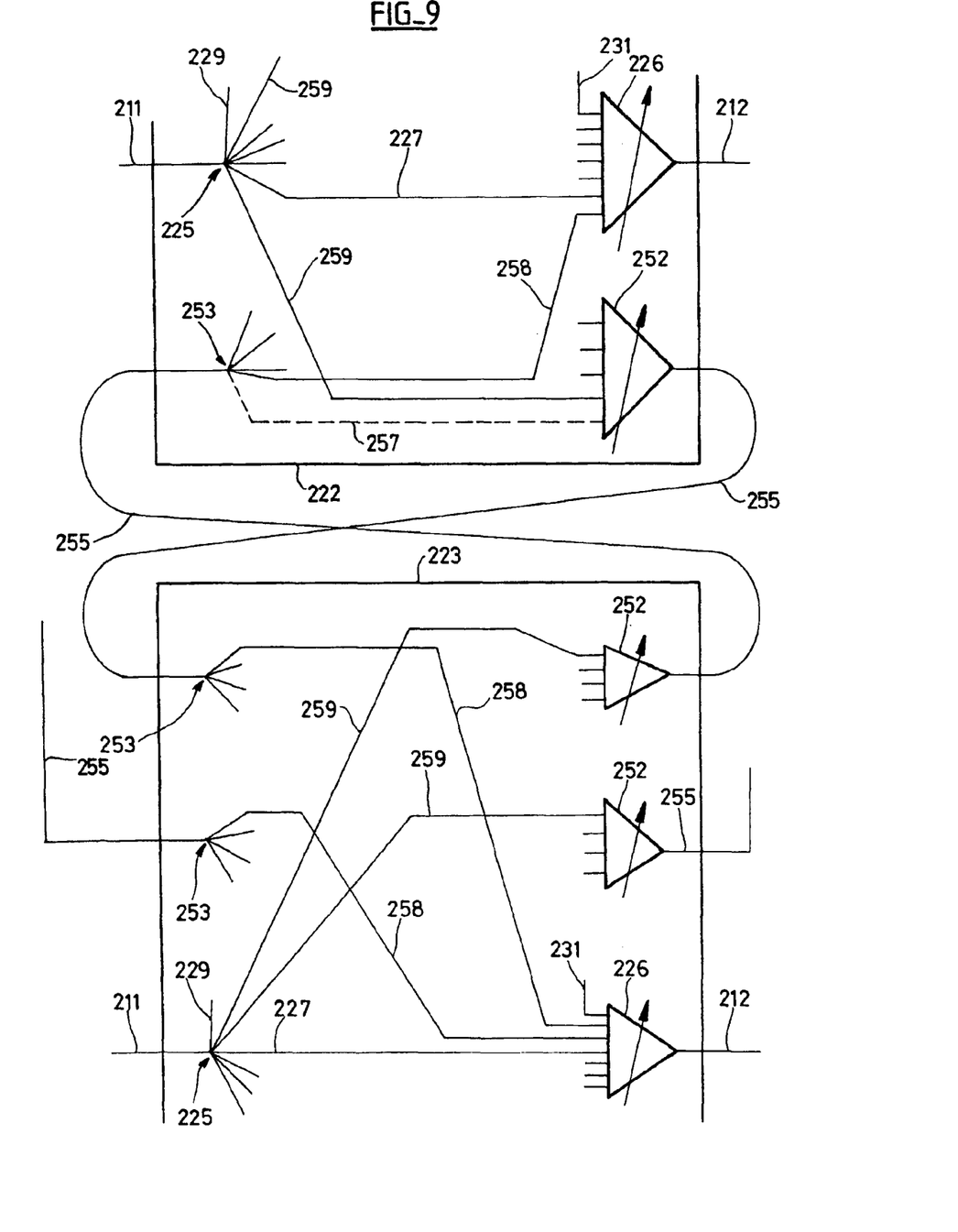
FIG. 9 is a partial view of a detail of the node of FIG. 8.

With reference to FIGS. 8 and 9, we will now describe another embodiment of the switching node, wherein recirculation assemblies are included to increase the node's flexibility, particularly in the aforementioned situations. Elements identical or analogous to the ones in FIGS. 1 and 2 have the same reference number, plus 200.

In FIGS. 8 and 9, each of the blocks 221 to 223 refers to a broadcast-and-select arrangement similar to the one in FIG. 2, modified to enable the recirculation of wavelength channels between the blocks. As before, these depicted blocks do not necessarily correspond to the node's hardware structures. In blocks 221 to 223, the number of inputs and outputs is greater than in FIG. 2. The additional inputs correspond to recirculation couplers 253, and the additional outputs to recirculation WSSs 252, which are partially depicted in FIG. 9.

The recirculation WSSs 252 are Wavelength Selective Switches whose operation was described above. Each recirculation WSS 252 receives WDM signals from multiple broadcast couplers 225, such as from all of the broadcast couplers 225 of the same block, in the example depicted. Thus, the recirculation WSS 252 receives optical signals from a broadcast coupler from each group. To achieve this, the broadcast couplers 225 have more outputs than in FIG. 2, such as two additional outputs, which are linked by optical connections 259 to inputs of the recirculation WSSs 252. FIG. 9 shows only a part of the block 222, and in particular only one of the block's two recirculation WSSs 252.

The signal obtained at the output of a recirculation WSS 252, known as a recirculated signal, is transmitted each time by a recirculation optical connection 255 to the input of a recirculation coupler 253 located within another block. Each time, a recirculation coupler 253 transmits the recirculated signal to multiple WSSs 226, such as to all the WSSs 226 in the same block in the example depicted. Thus, the recirculated optical signal is transmitted to a WSS in each group simultaneously. To achieve this, the WSSs 226 have more inputs than in FIG. 2, such as two additional inputs, which are linked by optical connections 258 to outputs of recirculation couplers 253 in the same block. Optionally, optical connections 257 may be provided between the recirculation couplers 253 and the recirculation WSSs 252, but this is generally needless.

The number of recirculation assemblies (i.e. WSS 252, connection 255 and coupler 253) configured in the node may be chosen based on the desired level of switching flexibility. In the example depicted, six recirculation assemblies are included so that each block can be linked by an optical recirculation connection 255 to the two other blocks.

Other configurations are possible. Preferentially, the recirculation WSSs 252 have a total number of inputs greater than or equal to the number of incoming optical fibers 211, so that every incoming signal can be recirculated. Preferentially, the recirculation couplers 253 have a total number of outputs greater than or equal to the number of outgoing optical fibers 212, so that any outgoing fiber can transmit a recirculated signal.

In one embodiment that is not depicted, optical amplifiers are provided in the recirculation assemblies in order to compensate for the attenuation of the recirculated signals.

In the switching nodes described above, wavelength selective switches serve as wavelength selective modules. However, other types of programmable multiplexers may also be used.

The architectures which were essentially depicted for degree-3 or degree-4 nodes may be constructed with any connectivity whatsoever, including a symmetrical connectivity with different numbers of inputs and outputs. The number of fibers in each connection direction is not necessarily equal. For a given connection direction, the number of incoming fibers is preferentially equal to the number of outgoing fibers.

One particular benefit of the architectures depicted in the preceding figures is the expandability of these architectures. For example, a degree-3 node as depicted in FIG. 4 may be fairly easy to expand into a degree-4 node as in FIG. 1 by adding the necessary elements, without substantially modifying the elements already installed. Likewise, spatial switching matrices and/or recirculation assemblies may gradually be added to an initial architecture in order to take into account increasing traffic and therefore an increase in competitive situations. This expandability may be encouraged by providing a sufficient number of ports on the WSSs and a sufficient number of branches on the couplers from the very beginning.

In FIGS. 1 to 9, the ability to drop traffic in the couplers 25/125/225 and add traffic in the WSSs 26/126/226 has been provided every time. However, there are other arrangements for connecting a traffic-adding module or traffic-dropping module into an optical node. These alternative arrangements may, for example, be preferred in order to limit the number of outputs needed in the couplers 25/125/225 and the number of inputs needed in the WSSs 26/126/226. In particular, architectures relying on broadcast couplers and WSSs with a relatively low number of ports have the benefit of limiting the node's add losses. At certain points of the network, it may also be helpful to include nodes with no drop module or with no add module.

Although the invention has been described in connection with multiple specific embodiments, it is naturally not in any way limited to them, and comprises all technical equivalents of the means described, as well as their combinations, if said combinations fall within the scope of the invention.

The use of the verb "comprise" or "include" and their conjugated forms does not exclude the presence of elements or steps other than those set forth in a claim. The use of the indefinite article "a" or "an" for an element or step does not, unless otherwise stated, excluded the presence of a plurality of such elements or steps. Multiple means or modules may be depicted by a single hardware element.

The invention claimed is:

1. An optical signal switching device, comprising:
a plurality of broadcast couplers, each one comprising an input capable of receiving an incoming wavelength division multiplexed optical signal and a plurality of outputs to distribute said incoming wavelength division multiplexed optical signal,
a plurality of wavelength selective modules, each one comprising a plurality of inputs for receiving wavelength channels and an output for transmitting an outgoing wavelength division multiplexed optical signal selectively obtained from the wavelength channels received at said plurality of inputs, and
an optical connection means that comprises at least one optical spatial switching matrix that has a respective input connected to each output of said broadcast couplers and outputs connected to one or more wavelength selective modules, said optical connection means being configured to link a plurality of routing outputs chosen from among said pluralities of broadcast couplers' outputs to a plurality of routing inputs chosen from among said pluralities of inputs of said wavelength selective modules to route said incoming wavelength division multiplexed optical signals received by said broadcast couplers to said wavelength selective modules,
wherein said wavelength selective modules are arranged into a plurality of groups, at least one of said groups comprising multiple said wavelength selective modules, the wavelength selective modules of one group each being configured to connect at their output to a common neighboring node, said optical connection means being configured to enable, for each of said broadcast couplers, the broadcasting of the incoming wavelength division multiplexed optical signal received by said broadcast couplers to at least one wavelength selective module of each group simultaneously.

2. The optical signal switching device according to claim 1, wherein said broadcast couplers are arranged into a plurality of groups, at least one of said groups comprising multiple said broadcast couplers, the broadcast couplers of one group each being configured to connect to a common neighboring node.

3. The optical signal switching device according to claim 2, wherein each of said wavelength selective modules comprises about as many of said outputs as the number of groups of wavelength selective modules.

4. The optical signal switching device according to claim 2, wherein said groups of broadcast couplers and sent groups of wavelength selective modules are equal in number.

5. The optical signal switching device according to claim 2, wherein the optical connection means are configured to enable, for each of said wavelengths selection modules, simultaneously routing optical signals coming from at least one broadcast coupler in each group of couplers to said wavelength selective module.

6. The optical signal switching device according to claim 1, wherein each of said broadcast couplers comprises said first plurality of outputs in an amount substantially equal to the number of groups of wavelength selective modules.

7. The optical signal switching device according to claim 1, wherein said optical connection means comprise waveguides each connecting one output of said plurality of routing outputs to an input of said plurality of routing inputs.

8. The optical signal switching device according to claim 7, wherein said waveguides connect each broadcast coupler to at least one wavelength selective module in each group.

9. The optical signal switching device according to claim 7, wherein a broadcast coupler receiving said incoming wavelength division multiplexed optical signal from a neighboring node has no direct optical connection with a group of wavelength selective modules connected to said neighboring node.

10. The optical signal switching device according to claim 1, wherein said optical connection means comprises inputs connected to routing outputs of the broadcast couplers, and outputs connected to routing inputs of wavelength selective modules, said optical spatial switching matrix outputs being connected to the at least one wavelength selective module from each group.

11. The optical signal switching device according to claim 10, wherein the optical spatial switching matrix comprises a respective output connected to each of said wavelength selective modules.

12. The optical signal switching device according to claim 1, wherein said optical connection means comprise a plurality of optical spatial switching matrix comprising inputs connected to routing outputs of said second plurality of outputs and outputs connected to routing inputs of said second plurality of inputs, the number of said optical spatial switching matrices being less than or equal to the number of said inputs of a wavelength selective module, each of said wavelength selective modules having inputs connected to all of said optical spatial switching matrices, each of said broadcast couplers having outputs connected to all of said optical spatial switching matrices.

13. An optical signal switching device, comprising:
a plurality of broadcast couplers, each one comprising an input capable of receiving an incoming wavelength division multiplexed optical signal and a plurality of outputs to distribute said incoming wavelength division multiplexed optical signal,
a plurality of wavelength selective modules, each one comprising a plurality of inputs for receiving wavelength channels and an output for transmitting an outgoing wavelength division multiplexed optical signal selectively obtained from the wavelength channels received at said plurality of inputs, and
an optical connection means linking a plurality of routing outputs chosen from among said pluralities of broadcast couplers' outputs to a plurality of routing inputs chosen from among said pluralities of inputs of said wavelength selective modules to route said incoming wavelength division multiplexed optical signals received by said broadcast couplers to said wavelength selective modules,
wherein said wavelength selective modules are arranged into a plurality of groups, at least one of said groups comprising multiple said wavelength selective modules, the wavelength selective modules of one group each being configured to connect at their output to a common neighboring node, said optical connection means being configured to enable, for each of said broadcast couplers, the broadcasting of the incoming wavelength division multiplexed optical signal received by said broadcast couplers to at least one wavelength selective module of each group simultaneously, and
wherein the optical signal switching device further comprises:
at least one recirculation assembly, said at least one recirculation assembly comprising a wavelength recirculation module comprising a plurality of inputs for receiving wavelength channels and an output for transmitting a wavelength division multiplexed recirculated optical signal selectively obtained from wavelength channels received at said plurality of inputs, a recirculation coupler comprising an input connected to the output of said wavelength recirculation module to receive said recirculated optical signal, and a plurality of outputs for distributing said recirculated optical signals,
second optical connection means connecting a plurality of recirculation outputs of the broadcast couplers to a plurality of inputs of said at least one wavelength recirculation module to route said incoming wavelength division multiplexed optical signals received by said broadcast couplers to said at least one wavelength recirculation module, and third optical connection means connecting a plurality of the outputs of said at least one recirculation coupler to a plurality of recirculation inputs of wavelength selective modules to route said at least one recirculated optical signal received by said at least one recirculation coupler to said wavelength selective modules.

14. The optical signal switching device according to claim 13, wherein said broadcast couplers are configured into a plurality of groups, at least one of said groups comprising several of said broadcast couplers, the broadcast couplers of one group each being connected to the input of a common neighboring node, said second optical connection means being configured to simultaneously route incoming optical signals received by at least one broadcast coupler in each group to said or each wavelength recirculation module.

15. The optical signal switching device according to claim 13, wherein said third optical connection means are configured to enable the broadcasting of said or each recirculated optical signal to at least one wavelength selective module from each group simultaneously.

16. The optical signal switching device according to claim 13, wherein a total number of inputs of recirculation module inputs is greater than or equal to the number of broadcast couplers.

17. The optical signal switching device according to claim 13, wherein a total number of recirculation module outputs is greater than or equal to the number of wavelength selective modules.

18. The optical signal switching device according to claim 13, wherein said second and third optical connection means comprise waveguides each connecting a broadcast coupler's recirculation output, or respectively a recirculation coupler's output, to a recirculation module's input, or respectively a wavelength selective module's recirculation input.

19. The optical signal switching device according to claim 13, wherein no direct optical connection connects a recirculation coupler's output to a wavelength recirculation module's input.

* * * * *